United States Patent [19]

Foley

[11] Patent Number: 4,844,342

[45] Date of Patent: Jul. 4, 1989

[54] SPRAY GUN CONTROL CIRCUIT

[75] Inventor: Raymond J. Foley, Toledo, Ohio

[73] Assignee: The DeVilbiss Company, Toledo, Ohio

[21] Appl. No.: 101,913

[22] Filed: Sep. 28, 1987

[51] Int. Cl.[4] ........................ A01G 27/00; F23D 11/46

[52] U.S. Cl. ........................................ 239/70; 239/415

[58] Field of Search ..................... 239/67, 69, 70, 300, 239/413, 414, 415

[56] References Cited

U.S. PATENT DOCUMENTS

| | | | |
|---|---|---|---|
| 2,112,546 | 3/1938 | Smart | 239/300 |
| 3,043,366 | 7/1962 | Wentworth | 239/69 |
| 3,945,533 | 3/1976 | Otto | 239/70 X |
| 4,590,576 | 5/1986 | Elpiner | 239/67 X |
| 4,593,360 | 6/1986 | Cocks | 239/69 X |
| 4,614,300 | 9/1986 | Falcoff | 239/69 X |
| 4,660,771 | 4/1987 | Chabert et al. | 239/69 X |

*Primary Examiner*—Andres Kashnikow
*Assistant Examiner*—Patrick N. Burkhart
*Attorney, Agent, or Firm*—MacMillan, Sobanski & Todd

[57] ABSTRACT

A circuit for controlling operation of valves which supply atomization air and pattern shaping air and coating fluid to a spray gun. In response to a trigger signal, air is immediately supplied to the spray gun. After a predetermined time delay, fluid is supplied to the spray gun. Fluid continues for the remainder of the duration of the trigger signal and air is continued for a predetermined time after the trigger signal has ceased.

5 Claims, 3 Drawing Sheets

SPRAY GUN CONTROL CIRCUIT

TECHNICAL FIELD

An improved control for an automatic spray gun and more particularly a control circuit for timing delivery of atomization air, pattern shaping air and fluid to an automatic spray gun such as a spray gun mounted on a programmable industrial robot.

BACKGROUND ART

Automatic spray guns are frequently used on manufacturing production lines for coating diverse articles. A spray gun may be mounted, for example, on an industrial robot located in a spray booth. While the workpiece is temporarily located in the spray booth, a robot controller executes a program for moving the spray gun along a predetermined a path spaced from the workpiece surface and for triggering the spray gun on and off at appropriate times to coat the workpiece.

When a spray gun is used on a programmable spray painting robot, finite control of both the air and the fluid must be established. A robot may move the spray gun, for example, at a normal speed of four feet per second. This converts to a spray gun movement of approximately 2.5 inches in 50 milliseconds. If fluid to the spray gun is controlled by a solenoid actuated trigger valve located at a considerable distance from the spray gun, long delays with accompanying long lead distances for triggering the spray gun are inherent in the system. The problem of lead distances and other problems can be eliminated by locating a solenoid actuated trigger valve which controls the delivery of coating fluid and a solenoid actuated air valve which controls the delivery of atomization air and pattern shaping air in or adjacent the spray gun.

Where separate valves are used, one for controlling atomization air and pattern shaping air and the other for controlling coating fluid, it is desirable to open the atomization and pattern shaping air valve prior to opening the fluid valve and to close the fluid valve prior to closing the atomization and pattern shaping air valve. This sequence assures proper atomization and a proper pattern to the leading and trailing edges of the atomized coating. Such a sequence is achieved in manual spray guns by the use of a manual trigger which sequentially opens the air valve and a fluid valve as the trigger is squeezed. When the trigger is released, the valves are closed in the reverse sequence. This operating sequence has not been performed automatically with two solenoid actuated valves located in the vicinity of the spray gun.

DISCLOSURE OF INVENTION

According to the invention, a spray gun control circuit is provided for sequentially actuating two solenoid valves in response to a trigger signal. One valve controls air flow for atomization and, when required, for pattern shaping and the other valve controls flow of coating fluid. A trigger signal is generatd by any well known apparatus, such as by a conventional programmable controller. In response to the trigger signal, the control circuit immediately opens the air valve to cause atomization air and, optionally, pattern shaping air to flow to the spray gun. A first timer causes the coating fluid valve to open a predetermined time after the air valve opens. When the trigger signal ceases, the fluid valve is immediately closed and a second timer causes the air valve to remain open for a predetermined time after the fluid valve is closed. The circuit also allows for individual actuation of the two valves for testing air pressure and fluid pressure and flow.

Accordingly, it is an object of the invention to provide a control circuit for a spray gun.

Another object of the invention is to provide a spray gun control circuit for controlling the delivery of atomization air, pattern shaping air and fluid to the spray gun.

Other objects and advantages of the invention will be apparent from the following description and the accompanying drawings.

BEST MODE FOR CARRYING OUT THE INVENTION

Figure 1:
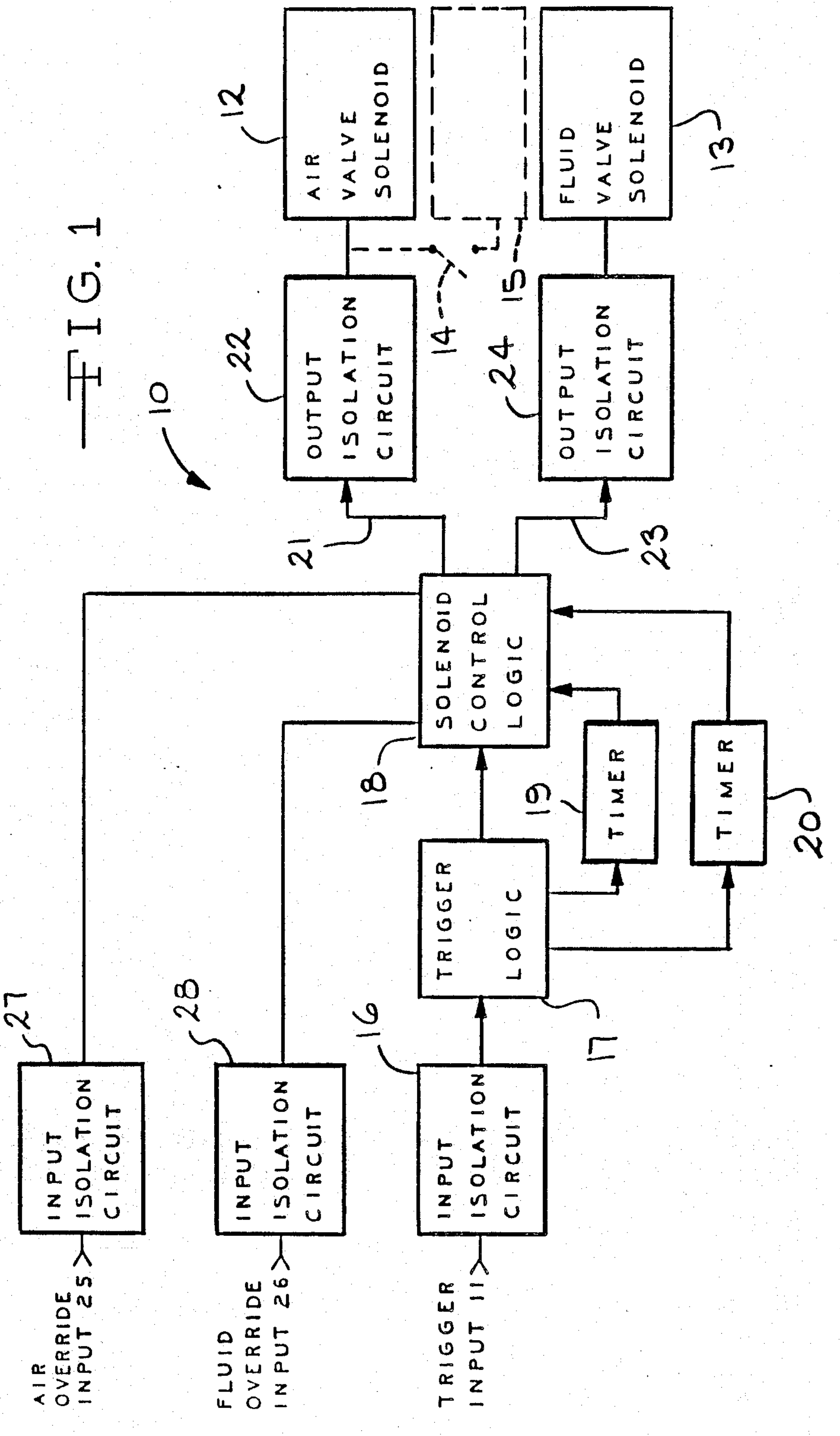
FIG. 1 is a block diagram of a spray gun control circuit according to the invention.

Turning to FIG. 1 of the drawings, a block diagram is shown for a spray gun control circuit 10 according to the invention. The circuit 10 is responsive to an externally generated trigger signal applied to an input 11 for timing operation of an air solenoid valve 12 and a coating fluid solenoid valve 13. The solenoid valve 12 normally comprises a single valve which controls the delivery of air to the spray gun both for coating fluid atomization and for pattern shaping. If desired, a separate valve may be provided downstream from the solenoid valve 12 for independently controlling the quantity or pressure of the pattern shaping air to adjust the size and shape of the atomized paint envelope. Or, an optional switch 14 and pattern shaping air solenoid valve 15 can be connected in parallel with the solenoid valve 12. With the switch 14 is closed, the solenoid 12 controls delivery of atomization air and the solenoid 15 controls delivery of pattern shaping air which imparts a flat or fan shape to the atomized paint envelope. If the switch 14 is opened, there will be no pattern shaping air and the atomized paint envelope will have a round shape. The switch 14 can be automatically operated, for example, by a programmable controller which generates the trigger signal and, if the spray gun is mounted on a robot, also controls operation of the robot.

The trigger signal input is applied through an input isolation circuit 16, which eliminates electrical noise and potentially damaging voltage surges originating outside the circuit 10, to trigger logic 17. The trigger signal input is applied through the trigger logic 17 to solenoid control logic 18. The trigger logic 17 also is responsive to the leading edge of the trigger signal for triggering a timer 19 and is responsive to the trailing edge of the trigger signal for triggering a timer 20. Upon triggering, the timer 19 applies a signal for a predetermined time to the solenoid control logic 18 and, upon triggering, the timer 20 applies a signal for a predetermined time to the solenoid control logic 18. The solenoid control logic 18 has an output 21 which is applied through an output isolation circuit 22 to actuate the air solenoid valve 12. The solenoid control logic 18 has a second output 23 which is connected through an output isolation circuit 24 to actuate the fluid solenoid valve 13. The output isolation circuits 22 and 24 protect the circuit 10 from electrical noise and potentially damaging voltage surges originating from outside the circuit 10 and provide signals at intrinsically safe levels for use in the class I, division I environment..

In operation, a trigger signal at the input 11 is applied through the isolation circuit 17, the trigger logic 17, the solenoid control logic 18 and the output isolation circuit 22 to actuate the air solenoid valve 12, causing atomization and pattern shaping air to be delivered to the spray gun. At the time the trigger signal is initiated, the trigger logic 17 starts the timer 19. While the timer 19 is running, the solenoid control logic 18 delays applying a signal on the output 23. When the timer 19 times out and so long as the trigger signal continues, the solenoid control logic 18 will apply a signal on the output 23 and thence through the isolation circuit 24 to actuate the fluid solenoid valve 13, causing coating fluid to be delivered to the spray gun. The fluid solenoid valve 13 and the air solenoid valve 12 will continue to be activated so long as a trigger signal continues to be applied to the input 11. When the trigger signal is interrupted, the solenoid control logic 18 immediately interrupts the output 23 to stop the flow of coating fluid. At the same time, the trigger logic 17 triggers the timer 20. While the timer 20 is running, the solenoid control logic 18 continues to apply a signal to the output 21 to continue delivery of atomization air and pattern shaping air for a predetermined time after the delivery of fluid is discontinued.

Two additional inputs 25 and 26 are shown connected to the circuit 10. The input 25 is connected through an input isolation circuit 27 to the solenoid control logic 18 and the input 26 is connected through an input isolation circuit 28 to the solenoid control logic 18. When a signal is applied to the input 25, an air override signal is applied to the solenoid control logic 18 to produce an output 21, thus causing a continuous delivery of air to the spray gun. When a signal is applied to the input 26, a fluid override signal is applied to the solenoid control logic 18 to produce an output 23, thus causing a continuous delivery of coating fluid to the spray gun. The air override permits measuring, calibrating and testing of the atomization air and the pattern shaping air and the fluid override permits measuring and calibrating the fluid pressure and flow.

Figure 2:
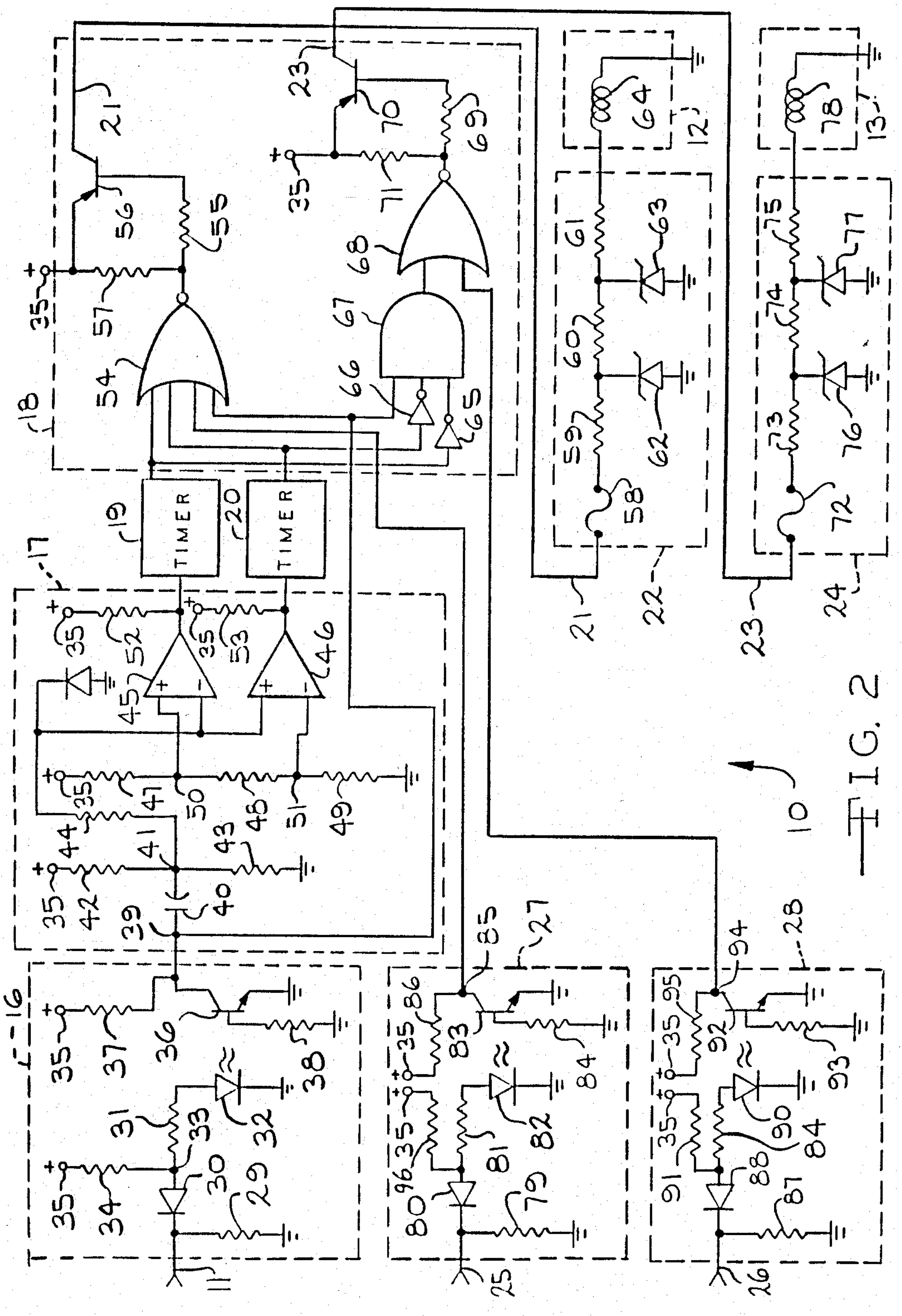
FIG. 2 is a detailed schematic diagram of a spray gun control circuit according to the invention.
Figure 3:
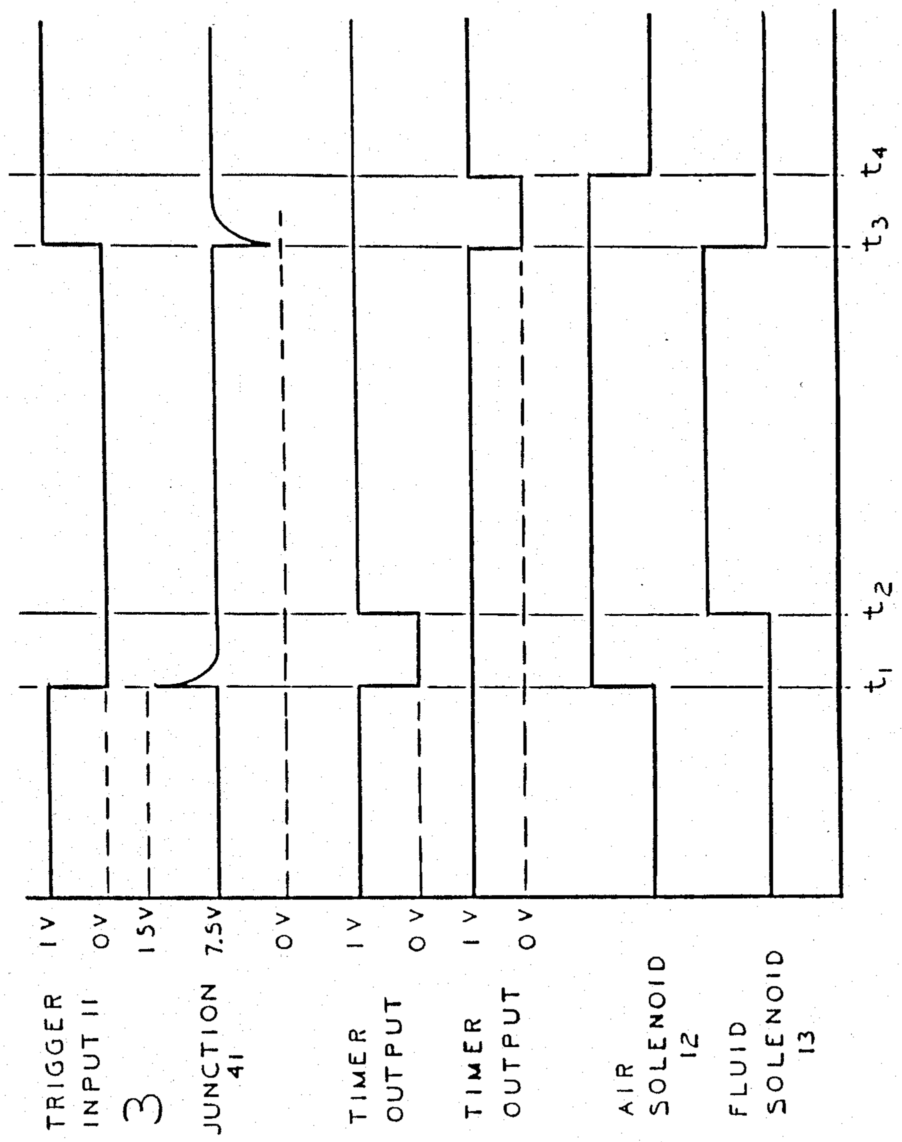
FIG. 3 is a graph illustrating signals at selected locations in the circuit of FIG. 2 in relationship to the timing of a trigger signal.

A detailed schematic diagram is provided in FIG. 2 for the spray gun control circuit 10 and signals appearing in the circuit 10 in relationship to the timing of a trigger signal on the input 11 are shown in FIG. 3. The input 11 is connected through a resistor 29 to ground and through a series diode 30 and resistor 31 to a light emitting diode (LED) 32. A junction 33 between the diode 30 and the resistor 31 is connected through a resistor 34 to a positive terminal of a suitable dc power source (not shown). In the absence of a trigger signal, current flows from the terminal 35 through the resistors 34 and 31 and the LED 32 contained in the optical isolator and infrared light is emitted from the LED 32. The light is sensed by a phototransistor 36 which causes a current to flow from the positive terminal 35 through a resistor 37 and the transistor 36 to ground. The circuit for the transistor 36 also includes a base resistor 38 connected to ground. When a trigger signal is applied to the input 11, the input 11 is grounded. This in turn interrupts current flow through the LED 32, causing the transistor 36 to stop conducting. At this time, a positive voltage or logic 1 trigger signal will be present on a junction 39 between the collector of the transistor 36 and the resistor 37. In the graph of FIG. 3, an exemplary trigger signal on the input 11 in illustrated. The trigger signal begins at time $t_1$ and continues until time $t_3$. The signal appearing on the junction 39 will have identical timing, only with reversed logic levels. The circuitry connected between the trigger input 11 and the junction 39 comprises the input isolation circuit 16 which protects the spray gun control circuit 10 from possible damage caused by electrical noise or a voltage surge.

The junction 39 is connected both to the trigger logic 17 and to the solenoid control logic 18. In the trigger logic 17, the junction 39 is connected through a capacitor 40 to a junction 41 between a resistor 42 connected to the positive terminal 35 and a resistor 43 connected to ground. The resistors 42 and 43 are of the same value so that if the terminal 35 is at 15 volts, for example, the junction 41 will normally be at 7.5 volts. The resistors 42 and 43 and the capacitor 40 form a midpoint differnetiator which will have a signal relative to the trigger signal as shown in FIG. 3. The signal will have a positive spike in response to the leading edge of the trigger signal and a negative spike in response to the trailing edge of the trigger signal.

The signal on the junction 41 is applied through a resistor 44 to the inverting input of a comparator 45 and to the noninverting input of a comparator 46. Three equal value resistors 47, 48 and 49 are connected in series between the positive terminal 35 and ground to form a voltage divider. A junction 50 between the resistors 47 and 48 is connected to the noninverting input to the comparator 45 and a junction 51 between the resistors 48 and 49 is connected to the inverting input to the comparator 46. The output of the comparator 45 is connected through a resistor 52 to the positive terminal 35 and to the trigger input of the timer 19. The output of the comparator 46 is connected through a resistor 53 to the positive terminal 35 and to the trigger input of the timer 20. The timers 19 and 20 may be commercially available integrated circuit timers and preferably may be individually adjusted to time predetermined time intervals through the selection of timing resistors and capacitors to provide a desired delay in the range of from about 50 milliseconds to about 1 second.

In operation, if the positive terminal 35 is at 15 volts, the junction 50 will be at 10 volts and the junction 51 will be at 5 volts. When the positive spike on the junction 41 at the leading edge of a trigger signal goes above 10 volts, the output of the comparator 45 triggers the timer 19 to produce a timed output signal beginning at time $t_1$, as shown in FIG. 3. When the negative spike on the junction 41 at the trailing edge of a trigger signal goes below 5 volts, the output of the comparator 46 triggers the timer 20 to produce a timed output signal beginning at time $t_3$, as shown in FIG. 3. If the trigger signal extends from time $t_1$ to time $t_3$, then the timer 19 will have an output from time $t_1$ to time $t_2$ and the timer 20 will have an output from time $t_3$ to time $t_4$.

The trigger signal, as taken at the junction 39 at the output of the input isolation circuit 16, and the outputs from the timers 19 and 20 are connected to a NOR gate 54 in the solenoid control logic 18. The output of the NOR gate 54 is connected through a resistor 55 to the base of an output transistor 56 and through a resistor 57 to the positive terminal 35. The emitter of the transistor 56 is connected to the positive terminal 35 and the collector of the transistor 56 forms the output 21 from the solenoid control logic 18.

The output isolation circuit 22 may comprise discrete components, as shown, or it may be purchased as a single component. The circuit 22, which may be a positive dc zener barrier circuit, as shown, or may be of other conventional deisgns for positive or negative dc or ac operation of the valve solenoid. The illustrated circuit 22 comprises a fuse 58 connected between the output 21 and three series resistors 59, 60 and 61. The junction between the resistors 59 and 60 is connected through a zener diode 62 to ground and the junction between the resistors 60 and 61 is connected through a zener diode 63 to ground. The resistor 61 is connected to a winding 64 of the air solenoid valve 12. The circuit 22 functions both to protect the circuit 10 from outside voltage surges and electrical noise and to limit the output current to protect the transistors 56 in the event of a short circuit in the winding 64.

In operation, whenever a trigger signal is applied to the input 11, a signal is applied from the junction 39 to the NOR gate 54 to turn on the transistor 56 and thus cause air to flow to the spray gun. The NOR gate 54 also will turn on the transistor 56 in response to a signal from the timer 20 or from the timer 19, although the timer 19 will be on simultaneously with the trigger signal. As shown in FIG. 3, the air solenoid 12 will be actuated to supply air to the spray gun for the duration of the trigger signal from time $t_1$ to time $t_3$ plus the time measured by the timer 19 from time $t_3$ to time $t_4$.

The outputs from the timers 19 and 20 also are connected, respectively, through inverters 65 and 66 to inputs of an AND gate 67. The AND gate 67 also has an input connected to the junction 39. The output of the AND gate 67 is connected to an input of a NOR gate 68. The output of the NOR gate 68 is connected through a resistor 69 to the base of an output transistor 70 and through a resistor 71 to the positive terminal 35. The emitter of the transistor 70 is connected to the positive terminal 35 and the collector forms the solenoid control logic output 23. The output isolation circuit 24 is similar to the circuit 22 and may comprise a fuse 72, three series connected resistors 73, 74 and 75 ahnd two zener diodes 76 and 77. The resistor 75 is connected to a winding 78 of the fluid solenoid valve 13.

Based upon the logic levels produced by the input isolation circuit 16 and the timers 19 and 20, the AND gate 67 will cause the NOR gate 68 to turn on the transistor 70 whenever a trigger signal is present on the input 11 and, simultaneously, both timers 19 and 20 are off. Thus, the fluid solenoid valve 13 will be actuated from the time $t_2$ to the time $t_3$, as shown in FIG. 3.

The input isolation circuit 27 is similar to the circuit 16. The air override input 25 is connected through a resistor 79 to ground and through a diode 80 and a resistor 81 to an LED 82. The junction between the diode 80 and the resistor 81 is connected through a resistor 96 to the positive terminal 35. So long as there is no signal on the air override input 25, i.e., the input 25 is not grounded, current will flow from the positive terminal 35 through the resistor 81 and the LED 82 to illuminate the LED 82. Light from the LED 82 is sensed by a phototransistor 83 which has a grounded emitter, a base connected through a resistor 84 to ground and a collector connected to a junction 85. The junction 85 is connected through a resistor 86 to the positive terminal 35. So long as there is no signal on the input 25, light from the LED 82 will turn on the transistor 83 and the junction 85 will be grounded. When a signal is present on the input 25, the LED 82 will be darkened, the transistor 83 will not conduct, and the resistor 86 will apply 15 volts to the junction 85. The junction 85 is connected to an input of the NOR gate 54 for turning on the output transistor 56 and thus activating the air solenoid valve 12 whenever a signal is applied to the air override input 25.

The input isolation circuit 28 is similar to the input isolation circuits 16 and 27. The fluid override input 26 is connected through a resistor 87 to ground and through a diode 88 and a resistor 89 to an LED 90. The junction between the diode 88 and the resistor 89 is connected through a resistor 91 to the positive terminal 35. Light from the LED 90 is sensed by a phototransistor 92 which has a base connected through a resistor 93 to ground, a grounded emitter and a collector connected to a junction 94 and thence through a resistor 95 to the positive terminal 35. The junction 94 is connected to an input to the NOR gate 68. Whenever a fluid override signal is applied to the input 26, the NOR gate 68 is responsive to the signal on the junction 94 for turning on the output transistor 70 to activate the fluid solenoid valve 13.

Although a specific spray gun control circuit 10 has been shown and described, it will be appreciated that various modifications and changes may be made without departing from the spirit and the scope of the following claims.

I claim:

1. A control circuit responsive to an electric trigger signal for controlling delivery of air and coating fluid to a spray gun comprising an electrically actuated air control valve and an electrically actuated coating fluid control valve, means for generating a first electric signal for actuating said air valve for the duration of the trigger signal plus a first predetermined time after the trigger signal ceases, and means responsive to said trigger signal for generating a second electric signal for actuating said coating fluid valve a second predetermined time after the start of the trigger signal through the remaining time of the trigger signal said means for generating a first electric signal including a first timer means for generating a signal having the duration of the first predetermined time, means responsive to the trailing edge of the trigger signal for starting said first timer means, and means responsive to either one of said trigger signal and said first timer means signal for actuating the air valve.

2. A control circuit responsive to an electric trigger signal for controlling delivery of air and coating fluid to a spray gun, as set forth in claim 1, wherein said means for generating a second electric signal includes a second timer means for generating a signal having the duration of the second predetermined time, means responsive to the leading edge of the trigger signal for starting said second timer means, sand means responsive to the trigger signal and the absence of a signal from said second timer means for actuating the coating fluid valve.

3. A control circuit responsive to an electric trigger signal for controlling delivery of air and coating fluid to a spray gun, as set forth in claim 2, and further including means for establishing an air override signal, and wherein said means responsive to either one of said trigger signal and said first timer means signal for actuating the air valve also in responsive to said override signal for actuating the air valve.

4. A control circuit responsive to an electric trigger signal for controlling delivery of air and coating fluid to a spray gun, as set forth in claim 2, and further including means for establishing a fluid override signal, and wherein said means responsive to the trigger signal and the absence of a signal from said second timer means for actuating the coating fluid valve also is responsive to said fluid override signal for actuating the coating fluid valve.

5. A control circuit responsive to an electric trigger signal for controlling delivery of air and coating fluid to a spray gun comprising an electrically actuated air control valve and an electrically actuated coating fluid control valve, means for generating a first electric signal for actuating said air valve for the duration of the trigger signal plus a first predetermined time after the trigger signal ceases, and means responsive to said trigger signal for generating a second electric signal for actuating said coating fluid valve a second predetermined time after the start of the trigger signal through the remaining time of the trigger signal said means for generating a second electric signal including a timer means for generating a signal having the duration of the second predetermined time, means responsive to the leading edge of the trigger signal for starting said timer means, and means responsive to the trigger signal and the absence of a signal from said timer means for actuating the coating fluid valve.

* * * * *